(12) United States Patent
Kawanami (10) Patent No.: US 10,175,262 B2
(45) Date of Patent: Jan. 8, 2019

(54) DOPPLER SHIFT FREQUENCY MEASURING DEVICE, LOG SPEED METER AND TIDAL CURRENT METER

(71) Applicant: Furuno Electric Co., Ltd., Nishinomiya (JP)

(72) Inventor: Satoshi Kawanami, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 352 days.

(21) Appl. No.: 15/158,441

(22) Filed: May 18, 2016

(65) Prior Publication Data

US 2016/0349281 A1 Dec. 1, 2016

(30) Foreign Application Priority Data

May 25, 2015 (JP) .................................. 2015-105105

(51) Int. Cl.
  *G01S 15/00* (2006.01)
  *G01P 5/24* (2006.01)
  *G01S 15/60* (2006.01)
(52) U.S. Cl.
  CPC .............. *G01P 5/241* (2013.01); *G01S 15/60* (2013.01)
(58) Field of Classification Search
  USPC ......................................................... 367/90
  See application file for complete search history.

(56) References Cited

U.S. PATENT DOCUMENTS

| 5,363,307 A | * | 11/1994 | Yoshida | G01C 13/002 |
| | | | | 367/113 |
| 6,339,396 B1 | * | 1/2002 | Mayersak | G01S 3/54 |
| | | | | 342/357.34 |
| 6,595,315 B1 | * | 7/2003 | Fujimoto | G01S 7/6218 |
| | | | | 181/124 |

(Continued)

FOREIGN PATENT DOCUMENTS

| EP | 0481083 A1 | * | 4/1992 | ........... G01S 15/025 |
| JP | 58072058 A | * | 4/1983 | .............. G01P 5/241 |

(Continued)

*Primary Examiner* — James R Hulka
(74) *Attorney, Agent, or Firm* — Alleman Hall Creasman & Tuttle LLP (57) ABSTRACT

A Doppler shift frequency measuring device is provided, which includes a plurality of transmitters respectively configured to transmit a transmission wave, a plurality of receivers provided corresponding to the transmitters, respectively, and configured to receive reception waves that are reflection waves caused by the transmission waves from the transmitters, respectively, and a reception signal processor configured to calculate Doppler shift frequencies of the reception waves by processing reception signals obtained based on the reception waves received by the receivers. The reception signal processor includes a reception circuit configured to generate a synthesized signal by synthesizing processing target signals of which center frequencies of main lobes of power spectra are different from each other, the processing target signals generated based on the reception waves, and a Doppler shift frequency calculating module configured to calculate the Doppler shift frequencies of the reception waves based on the synthesized signal.

8 Claims, 8 Drawing Sheets

(56) References Cited

U.S. PATENT DOCUMENTS

| | | | | |
|---|---|---|---|---|
| 6,802,219 B2 * | 10/2004 | Joseph | ............... | G01C 13/008 |
| | | | | 73/170.05 |
| 7,006,406 B2 * | 2/2006 | Fujimoto | ............. | G01S 7/6218 |
| | | | | 367/112 |
| 7,289,390 B2 * | 10/2007 | Nishimori | ............ | G01S 15/107 |
| | | | | 367/103 |
| 2004/0003958 A1 * | 1/2004 | Fujimoto | ............. | G01S 7/6218 |
| | | | | 181/124 |
| 2006/0013066 A1 * | 1/2006 | Nishimori | ............ | G01S 15/107 |
| | | | | 367/88 |
| 2006/0133210 A1 * | 6/2006 | Ishihara | ................. | G01S 7/527 |
| | | | | 367/99 |
| 2012/0169542 A1 * | 7/2012 | Mathews | ............... | G01S 5/021 |
| | | | | 342/450 |

FOREIGN PATENT DOCUMENTS

| | | | | |
|---|---|---|---|---|
| JP | 05080151 A | * | 4/1993 | |
| JP | 2007064768 A | * | 3/2007 | ......... G01S 7/52004 |
| WO | 2014199758 A1 | | 12/2014 | |

* cited by examiner

DOPPLER SHIFT FREQUENCY MEASURING DEVICE, LOG SPEED METER AND TIDAL CURRENT METER

CROSS-REFERENCE TO RELATED APPLICATION(S)

This application claims priority under 35 U.S.C. § 119 to Japanese Patent Application No. 2015-105105, which was filed on May 25, 2015, the entire disclosure of which is hereby incorporated by reference.

TECHNICAL FIELD

This disclosure relates to a Doppler shift frequency measuring device which measures a Doppler shift frequency, and a log speed meter and a tidal current meter which include the Doppler shift frequency measuring device.

BACKGROUND

WO2014/199758A1, for example, discloses one example of conventionally-known tidal current meters. With this tidal current meter, reception waves received by a plurality of transducers are processed by reception signal processors (reception amplifiers, ADCs, filters, and frequency detecting units) provided corresponding to the respective transducers. Further, the tidal current meter calculates a speed of a tidal current based on Doppler shift frequencies detected by the respective reception signal processors.

With the tidal current meter disclosed in WO2014/199758A1, since the reception signal processors are provided corresponding to the respective transducers as described above, the tidal current meter becomes a redundant system as a whole.

SUMMARY

The purpose of this disclosure relates to providing a Doppler shift frequency measuring device which has a simplified configuration, and a log speed meter and a tidal current meter which include the Doppler shift frequency measuring device.

(1) According to one aspect of this disclosure, a Doppler shift frequency measuring device is provided. The device includes a plurality of transmitters respectively configured to transmit a transmission wave, a plurality of receivers provided corresponding to the transmitters, respectively, and configured to receive reception waves that are reflection waves caused by the transmission waves from the transmitters, respectively, and a reception signal processor configured to calculate Doppler shift frequencies of the reception waves by processing reception signals obtained based on the reception waves received by the receivers. The reception signal processor includes a reception circuit configured to generate a synthesized signal by synthesizing processing target signals of which center frequencies of main lobes of power spectra are different from each other, the processing target signals generated based on the reception waves, and a Doppler shift frequency calculating module configured to calculate the Doppler shift frequencies of the reception waves based on the synthesized signal.

(2) The transmitters may transmit the transmission waves of which center frequencies of main lobes of power spectra are different from each other. The reception circuit may generate the synthesized signal by synthesizing the reception signals as the processing target signals.

(3) The center frequencies of the main lobes of the power spectra of the transmission waves may be set based on a highest value of a traveling speed of a movable body on which the Doppler shift frequency measuring device is mounted.

(4) The transmitters may transmit the transmission waves of which center frequencies of main lobes of power spectra are the same as each other. The reception signal processor may also include frequency shifters configured to generate the processing target signals by shifting center frequencies of the reception signals that are obtained based on the reception waves received by the receivers, to different center frequencies, respectively.

(5) The Doppler shift frequency measuring device may be mounted on a ship as a movable body capable of traveling on water.

(6) The Doppler shift frequency measuring device may further include a transducer in which the transmitters and the receivers corresponding to the transmitters are integrated with each other.

(7) According to another aspect of this disclosure, a log speed meter is provided. The log speed meter includes the Doppler shift frequency measuring device having the configurations described above, and a log speed calculating module configured to calculate a log speed of the ship on which the Doppler shift frequency measuring device is mounted, based on the Doppler shift frequencies calculated by the Doppler shift frequency measuring device.

(8) According to another aspect of this disclosure, a tidal current meter is provided. The tidal current meter includes the Doppler shift frequency measuring device having the configurations described above, a log speed calculating module configured to calculate a log speed of the ship on which the Doppler shift frequency measuring device is mounted, based on the Doppler shift frequencies calculated by the Doppler shift frequency measuring device, a ground speed calculating module configured to calculate a ground speed of the ship, and a tidal current speed calculating module configured to calculate a speed of a tidal current based on the log speed calculated by the log speed calculating module and the ground speed calculated by the ground speed calculating module.

According to this disclosure, a Doppler shift frequency measuring device which has a simplified configuration, a log speed meter and a tidal current meter which include the Doppler shift frequency measuring device can be provided.

BRIEF DESCRIPTION OF THE DRAWING(S)

The present disclosure is illustrated by way of example and not by way of limitation in the figures of the accompanying drawings, in which like reference numerals indicate like elements and in which.

DETAILED DESCRIPTION

Next, one embodiment of a log speed meter 1 including a Doppler shift frequency measuring device 2 according to this disclosure is described with reference to the accompanying drawings. In the following embodiments, an example is illustrated in which this disclosure is applied to a ship. However, the present disclosure may be applied to any kinds of vehicles having a rudder or a similar steering device, such as other watercrafts including boats, vessels, and submarines, as well as land vehicles, airplanes and spaceships. Therefore, the term "ship" herein refers to one example of the vehicle, and the vehicle corresponds to the movable body in the claims.

Figure 1:
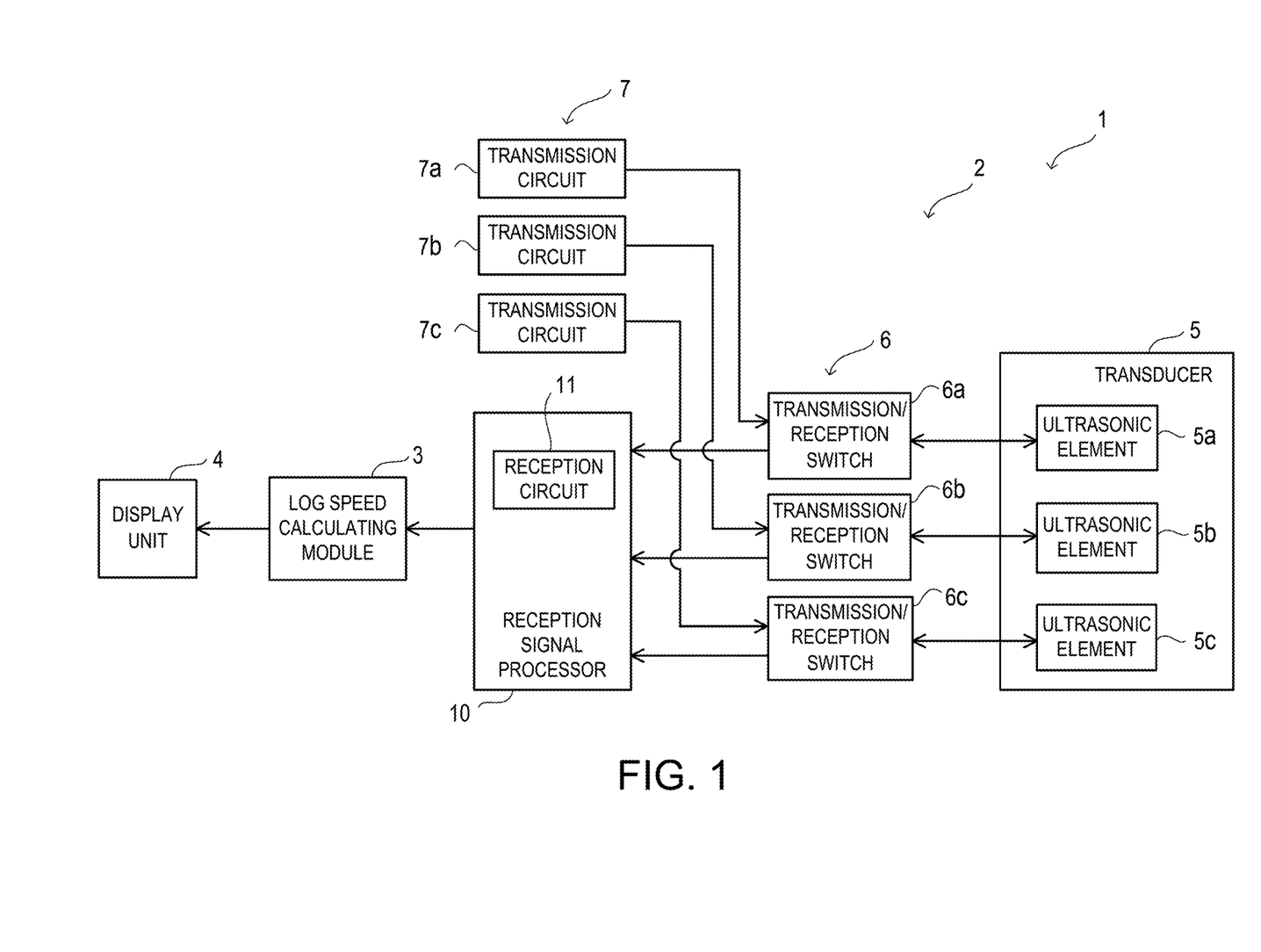
FIG. 1 is a block diagram of a log speed meter according to one embodiment of this disclosure.
Figure 2:
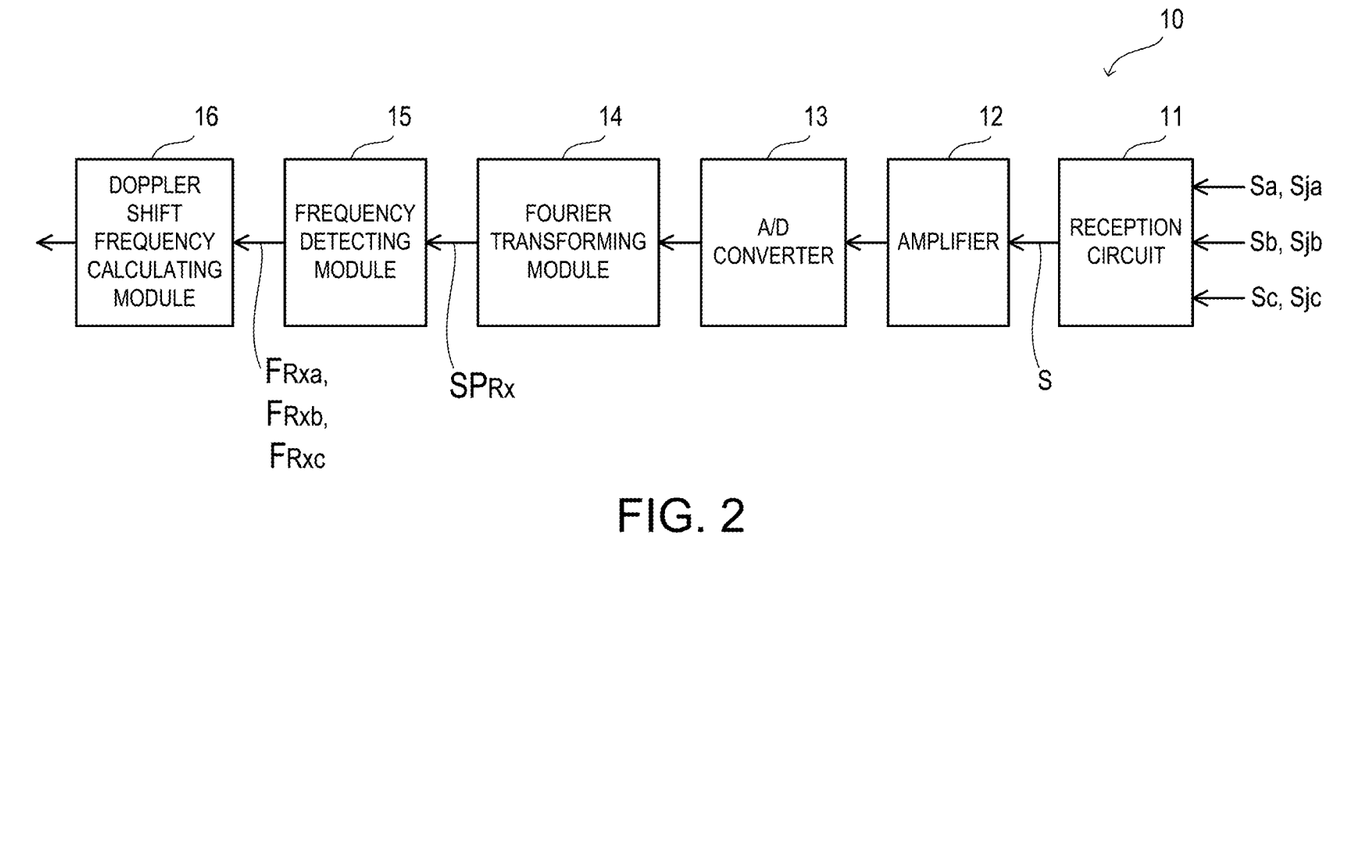
FIG. 2 is a block diagram of a reception signal processor illustrated in FIG. 1.

FIG. 1 is a block diagram of the log speed meter 1 according to the embodiment of this disclosure. Further FIG. 2 is a block diagram of a reception signal processor 10 illustrated in FIG. 1. The log speed meter 1 of this embodiment is, for example, fixed at a bottom of a ship (movable body), and exposed to water. The log speed meter 1 measures a log speed of the ship on which the log speed meter 1 is mounted (hereinafter, may simply be referred to as "the ship"). Note that, among a plurality of components of the reception signal processor 10, only a reception circuit 11 (described later in detail) is illustrated in FIG. 1.

As illustrated in FIG. 1, the log speed meter 1 includes the Doppler shift frequency measuring device 2, a log speed calculating module 3, and a display unit 4.

The Doppler shift frequency measuring device 2 includes a transducer 5, a transmission/reception switching mechanism 6, a transmission circuit group 7, and the reception signal processor 10.

The transducer 5 has three ultrasonic elements 5a, 5b and 5c. Each of the ultrasonic elements 5a, 5b and 5c is fixed at the bottom of the ship so that its transmitting-and-receiving surface (not illustrated) configured to transmit and receive an ultrasonic wave is exposed to the water. The transmitting-and-receiving surfaces of the ultrasonic elements 5a, 5b and 5c are oriented in different directions from each other. In this embodiment, the transmitting-and-receiving surface of the ultrasonic element 5a is oriented forward of the ship, and the transmitting-and-receiving surfaces of the ultrasonic elements 5b and 5c are oriented obliquely rearward of the ship on the starboard side and the port side, respectively.

The ultrasonic elements 5a, 5b and 5c are capable of transmitting the ultrasonic waves into the water. Further, each of the ultrasonic elements 5a, 5b and 5c converts the received ultrasonic wave (reception wave) into an electric signal, and outputs it to the transmission/reception switching mechanism 6. Note that, hereinafter, the electric signal obtained based on the reception wave received by the ultrasonic element 5a (reception signal) is Sa, the electric signal obtained based on the reception wave received by the ultrasonic element 5b (reception signal) is Sb, and the electric signal obtained based on the reception wave received by the ultrasonic element 5c (reception signal) is Sc.

Moreover, center frequencies $F_{Txa}$, $F_{Txb}$ and $F_{Txc}$ (see FIG. 4) of the ultrasonic waves transmitted from the respective ultrasonic elements 5a, 5b and 5c are different from each other. A detailed description regarding the frequencies of the ultrasonic waves will be given below.

The transmission/reception switching mechanism 6 has three transmission/reception switches 6a, 6b and 6c. In transmission, the transmission/reception switch 6a switches a connection (signal flow path) so that a transmission signal is transmitted from a transmission circuit 7a to the ultrasonic element 5a, the transmission/reception switch 6b switches a connection so that a transmission signal is transmitted from a transmission circuit 7b to the ultrasonic element 5b, and the transmission/reception switch 6c switches a connection so that a transmission signal is transmitted from a transmission circuit 7c to the ultrasonic element 5c. Further in reception, the transmission/reception switches 6a, 6b and 6c switch the connections so that the reception signals Sa, Sb and Sc converted from the ultrasonic waves by the respective ultrasonic elements 5a, 5b and 5c are transmitted from the ultrasonic elements 5a, 5b and 5c to the reception signal processor 10.

The transmission circuit group 7 includes the three transmission circuits 7a, 7b and 7c. The transmission circuits 7a, 7b and 7c generate the transmission signals that are bases of the ultrasonic waves to be transmitted from the respective ultrasonic elements 5a, 5b and 5c, and output the transmission signals to the transducer 5 via the transmission/reception switching mechanism 6. The transmission circuits 7a, 7b and 7c output the transmission signals having different center frequencies from each other, to the respective ultrasonic elements 5a, 5b and 5c so that ultrasonic waves having different center frequencies from each other are outputted from the ultrasonic elements 5a, 5b and 5c, respectively.

[Reception Signal Processor]

The reception signal 10 performs particular processing on each of the reception signals Sa, Sb and Sc transmitted from the transducer 5 to calculate a Doppler shift frequency for each of the reception signals Sa, Sb and Sc.

As illustrated in FIG. 2, the reception signal processor 10 includes the reception circuit 11, an amplifier 12, an A/D converter 13, a Fourier transforming module 14, a frequency detecting module 15, and a Doppler shift frequency calculating module 16.

The reception circuit 11 receives all the reception signals Sa, Sb and Sc having different center frequencies from each other, which are outputted from the respective ultrasonic elements 5a, 5b and 5c, and generates a synthesized signal S. Specifically, in this embodiment, the reception circuit 11 receives the reception signals Sa, Sb and Sc as processing target signals Sja, Sjb and Sjc, and synthesize these signals with each other to generate the synthesized signal S.

As described above, in this embodiment, different from the conventional example in which the reception circuit is provided corresponding to each of the plurality of transmission circuits (e.g., a plurality of reception circuits are provided), the number of the provided reception circuit 11 is one. After the reception signals Sa, Sb and Sc received by the reception circuit 11 are converted into the synthesized signal S, the synthesized signal S is amplified by the amplifier 12 and converted into a digital signal by the A/D converter 13.

Figure 3:
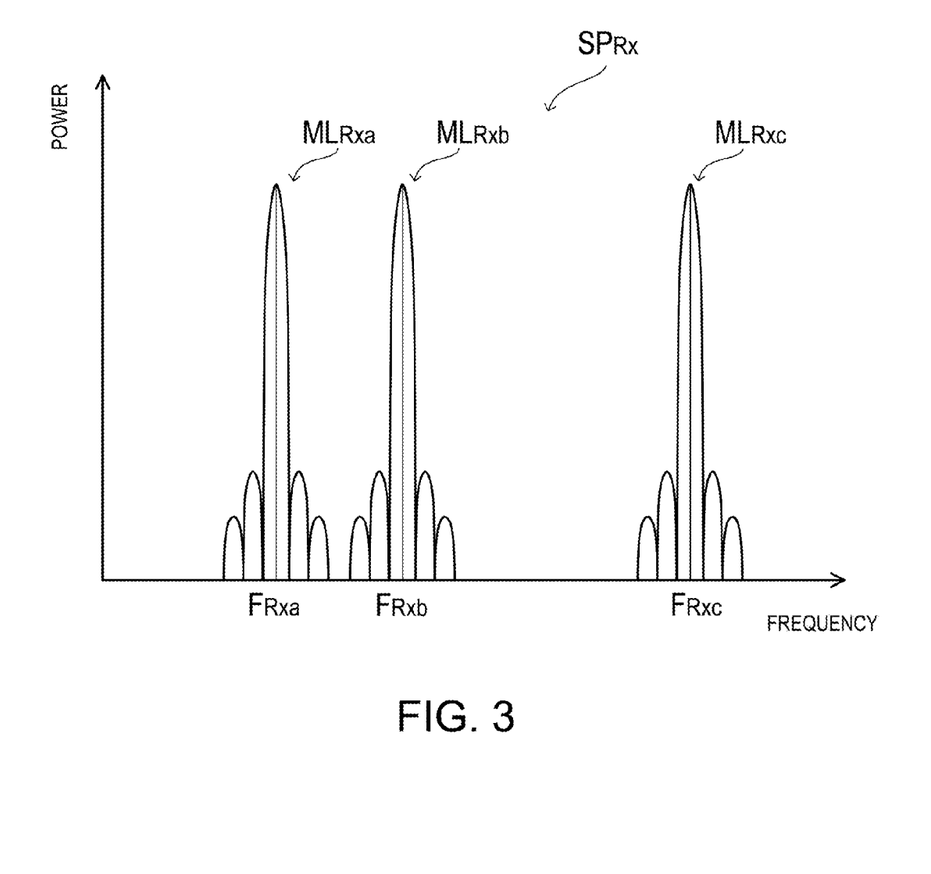
FIG. 3 is a power spectrum of a synthesized signal generated by a Fourier transforming module.

FIG. 3 is a power spectrum $SP_{Rx}$ of the synthesized signal S generated by the Fourier transforming module 14. The Fourier transforming module 14 Fourier-transforms the digital signal generated by the A/D converter 13. Thus, the synthesized signal S that is expressed with a time range, which is converted into the digital signal, is converted into the power spectrum $SP_{Rx}$ that is expressed with a frequency range.

The frequency detecting module 15 detects peak values of main lobes $ML_{Rxa}$, $ML_{Rxb}$ and $ML_{Rxc}$ included in the power spectrum $SP_{Rx}$ of the synthesized signal S generated by the Fourier transforming module 14, and detects frequencies $F_{Rxa}$, $F_{Rxb}$ and $F_{Rxc}$ of the respective peak values.

Figure 4:
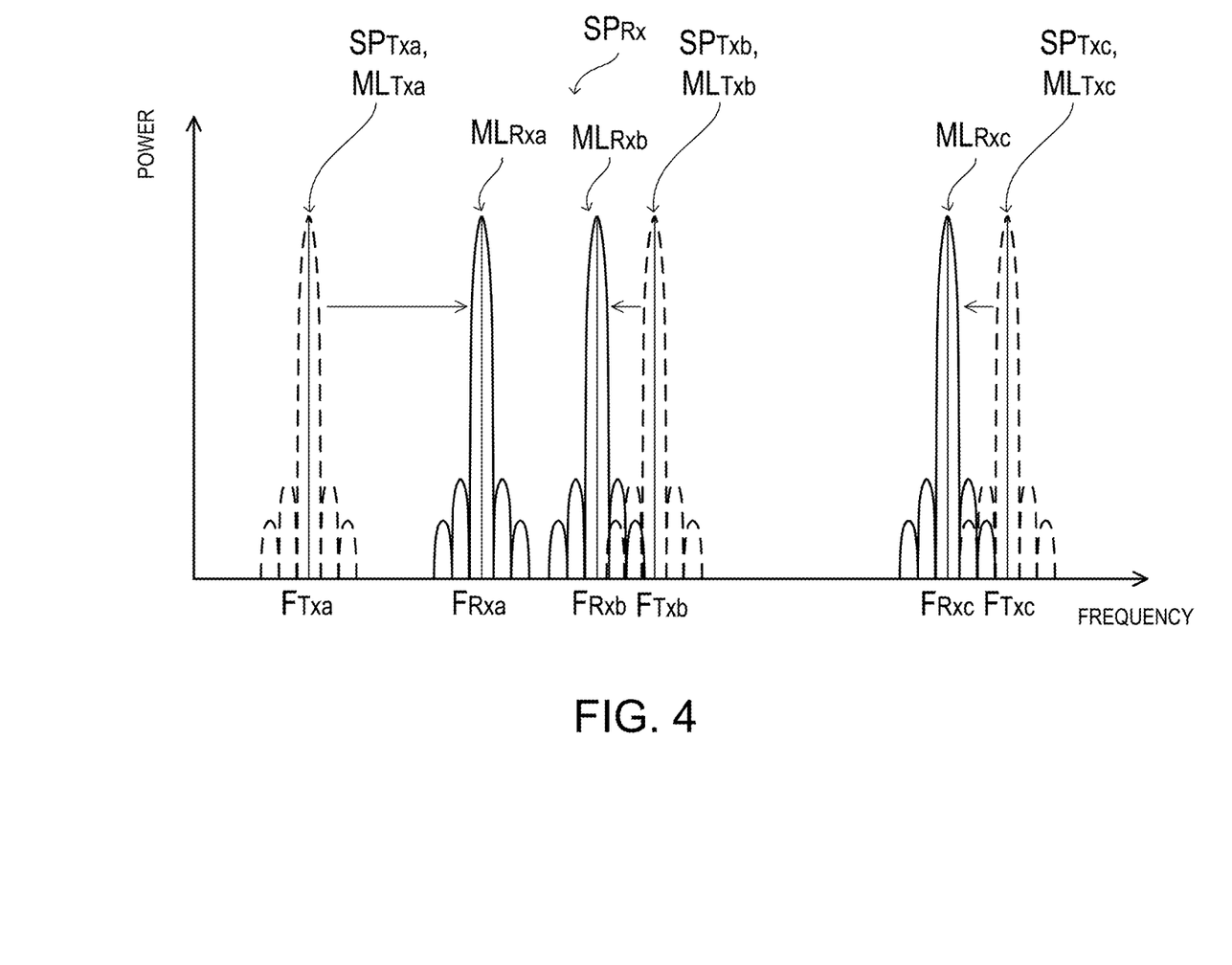
FIG. 4 is a chart illustrating power spectra of ultrasonic waves transmitted from a plurality of ultrasonic elements, overlapped with the power spectrum of the synthesized signal.

FIG. 4 is a chart illustrating power spectra $SP_{Txa}$, $SP_{Txb}$ and $SP_{Txc}$ of the ultrasonic waves transmitted from the respective ultrasonic elements 5a, 5b and 5c, overlapped with the power spectrum $SP_{Rx}$ of the synthesized signal S. Note that in FIG. 4, the power spectra $SP_{Txa}$, $SP_{Txb}$ and $SP_{Txc}$ of the ultrasonic waves are indicated by dashed lines, and the power spectrum $SP_{Rx}$ of the reception waves is indicated by solid lines. The Doppler shift frequency calculating module 16 calculates Doppler shift frequencies by using the center frequencies $F_{Rxa}$, $F_{Rxb}$ and $F_{Rxc}$ of the main lobes $ML_{Rxa}$, $ML_{Rxb}$ and $ML_{Rxc}$ detected by the frequency detecting module 15. Specifically, the Doppler shift frequency calculating module 16 calculates the Doppler shift frequencies for the respective ultrasonic elements 5a, 5b and 5c based on a difference between the center frequency $F_{Txa}$ of the ultrasonic wave transmitted from the ultrasonic element 5a and the center frequency $F_{Rxa}$ of the ultrasonic wave received thereby, a difference between the center frequency $F_{Txb}$ of the ultrasonic wave transmitted from the ultrasonic element 5b and the center frequency $F_{Rxb}$ of the ultrasonic wave received thereby, and a difference between the center frequency $F_{Txc}$ of the ultrasonic wave transmitted from the ultrasonic element 5c and the center frequency $F_{Rxc}$ of the ultrasonic wave received thereby, respectively.

The log speed calculating module 3 calculates the log speed of the ship based on the Doppler shift frequencies calculated for the ultrasonic elements 5a, 5b and 5c, respectively.

The display unit 4 displays the log speed of the ship calculated by the log speed calculating module 3.

[Frequencies of Transmission Waves Transmitted from Respective Ultrasonic Elements]

As described above, FIG. 4 is the chart illustrating the power spectra $SP_{Txa}$, $SP_{Txb}$ and $SP_{Txc}$ of the ultrasonic waves transmitted from the respective ultrasonic elements 5a, 5b and 5c, overlapped with the power spectrum $SP_{Rx}$ of the synthesized signal S. The chart in the example of FIG. 4 is for a case where a traveling speed of the ship is at a highest value. Note that in FIG. 4, an example in which intervals of the center frequencies of the ultrasonic waves transmitted from the ultrasonic elements 5a, 5b and 5c are even is described; however, without limiting to this, the intervals of the center frequencies of the ultrasonic waves may not be even.

In the log speed meter 1 of this embodiment, as illustrated in FIG. 4, the center frequencies of the transmission waves are set so that the main lobes $ML_{Rxa}$, $ML_{Rxb}$ and $ML_{Rxc}$ of the reception waves received by the ultrasonic elements 5a, 5b and 5c do not interfere with each other even when the traveling speed of the ship is at the highest value. By setting the center frequencies of the transmission waves as above, the center frequencies $F_{Rxa}$, $F_{Rxb}$ and $F_{Rxc}$ of the main lobes $ML_{Rxa}$, $ML_{Rxb}$ and $ML_{Rxc}$ of the reception waves can surely be detected.

[Effects]

As described above, with the Doppler shift frequency measuring device 2 of this embodiment, the processing target signals Sja, Sjb and Sjc obtained from the reception waves received by the ultrasonic elements 5a, 5b and 5c are synthesized by the single reception circuit 11 to generate the synthesized signal S. Further with the Doppler shift frequency measuring device 2, the Doppler shift frequencies are calculated based on the synthesized signal S. In other words, according to the log speed meter 1, the Doppler shift frequencies can be calculated by the single reception circuit 11 without providing a plurality of reception circuits as the conventional example.

Therefore, according to the Doppler shift frequency measuring device 2, the Doppler shift frequency measuring device having the simplified configuration can be provided.

Further, with the Doppler shift frequency measuring device 2, the transmission waves having the different center frequencies are transmitted from the ultrasonic elements 5a, 5b and 5c. Thus, the interference of the plurality of main lobes $ML_{Rxa}$, $ML_{Rxb}$ and $ML_{Rxc}$ included in the synthesized signal S with each other can be suppressed. In this manner, the center frequencies $F_{Rxa}$, $F_{Rxb}$ and $F_{Rxc}$ of the main lobes $ML_{Rxa}$, $ML_{Rxb}$ and $ML_{Rxc}$ can easily be detected, and as a result, the log speed of the ship can easily be calculated.

Further, with the Doppler shift frequency measuring device 2, the center frequencies of the processing target signals Sja, Sjb and Sjc configuring the synthesized signal S are set based on the highest value of the traveling speed of the ship on which the Doppler shift frequency measuring device 2 is mounted. In this manner, no matter what speed the ship is traveling, the interference of the main lobes $ML_{Rxa}$, $ML_{Rxb}$ and $ML_{Rxc}$ with each other can be avoided. Thus, the center frequencies $F_{Rxa}$, $F_{Rxb}$ and $F_{Rxc}$ of the main lobes $ML_{Rxa}$, $ML_{Rxb}$ and $ML_{Rxc}$ included in the power spectrum $SP_{Rx}$ obtained from the synthesized signal S can easily be detected, and as a result, the log speed of the ship can easily be calculated.

Further, the Doppler shift frequency measuring device 2 is mounted on the ship. Therefore, the log speed of the ship, a tidal current speed near the ship, etc., can be calculated.

Further, with the Doppler shift frequency measuring device 2, each of the ultrasonic elements 5a, 5b and 5c achieves both functions of a transmitter and a receiver. Therefore, the configuration of the Doppler shift frequency measuring device 2 can be simplified.

Further, with the log speed meter 1 of this embodiment, the log speed meter including the Doppler shift frequency measuring device having the simplified configuration can be provided.

MODIFICATIONS

Although the embodiment of this disclosure is described above, this disclosure is not limited to this, and may be changed variously without deviating from the scope of this disclosure.

Figure 5:
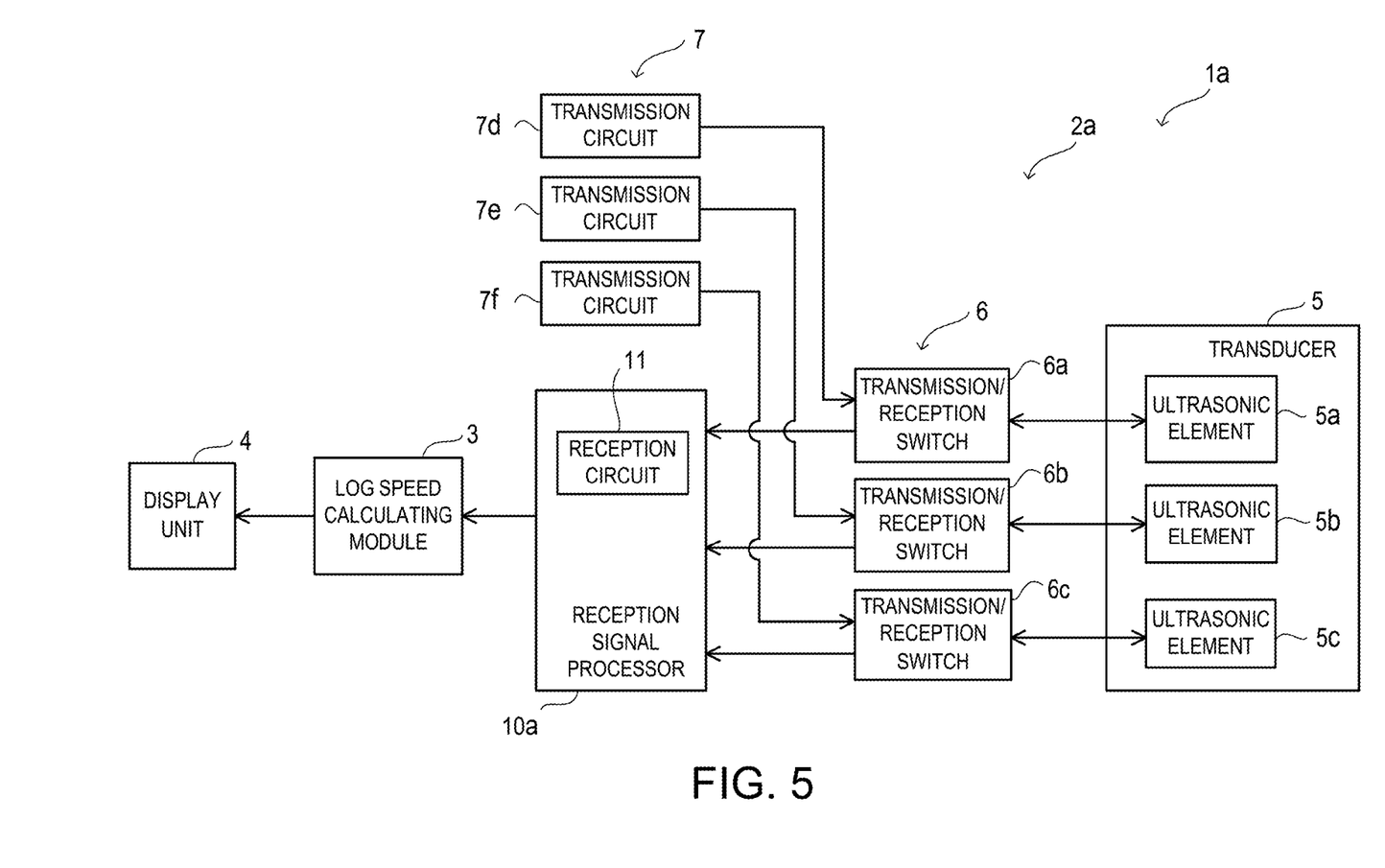
FIG. 5 is a block diagram of a log speed meter according to a modification.
Figure 6:
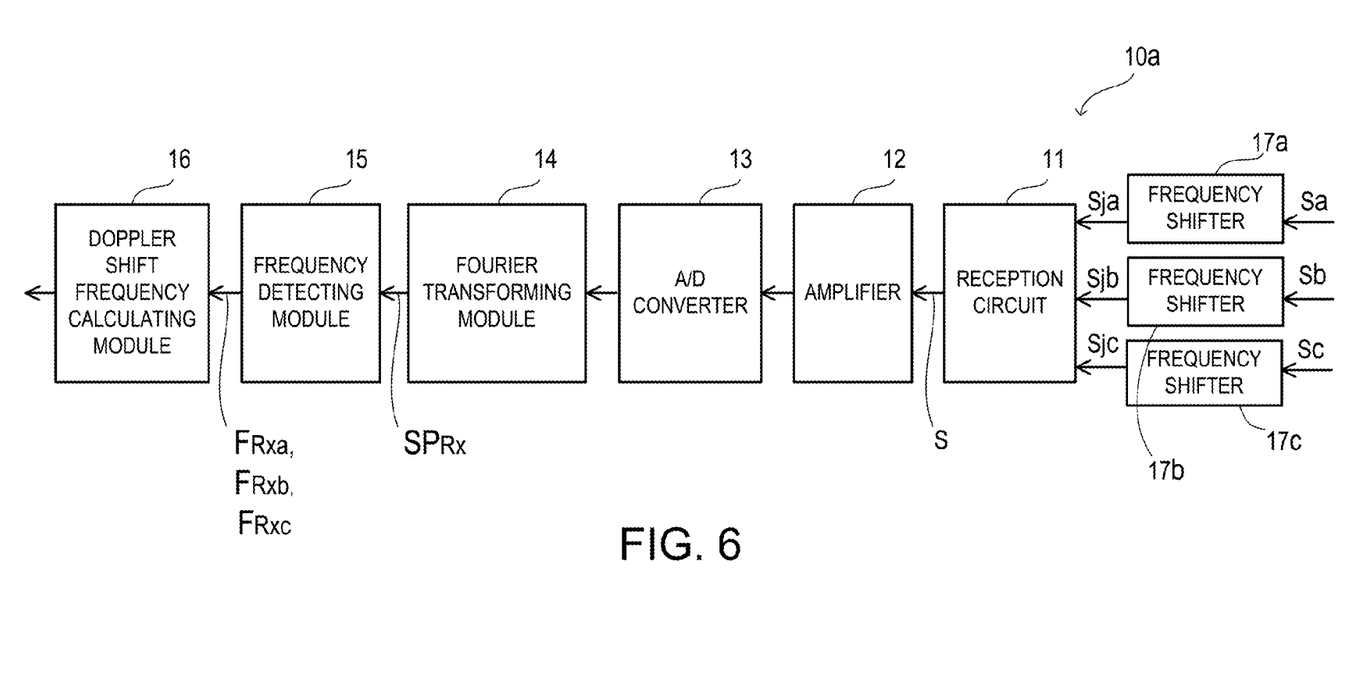
FIG. 6 is a block diagram of a reception signal processor illustrated in FIG. 5.

(1) FIG. 5 is a block diagram of a log speed meter 1a having a Doppler shift frequency measuring device 2a according to a modification. Further FIG. 6 is a block diagram of a reception signal processor 10a illustrated in FIG. 5. The Doppler shift frequency measuring device 2a of this modification has different configurations of the transmission circuits and the reception circuit, from the Doppler shift frequency measuring device 2 of the embodiment. Hereinafter, the different part from the embodiment is mainly described and description of other parts is omitted.

The Doppler shift frequency measuring device 2a of this modification includes three transmission circuits 7d, 7e and 7f. The transmission circuits 7d, 7e and 7f generate transmission signals having the same center frequencies of main lobes of power spectra. Each of the transmission signals generated by the transmission circuits 7d, 7e and 7f, respectively, is outputted to a corresponding ultrasonic element among the ultrasonic elements 5a, 5b and 5c. Thus, the ultrasonic elements 5a, 5b and 5c transmit the transmission waves having the same center frequencies of the main lobes of the power spectra.

Figure 7:
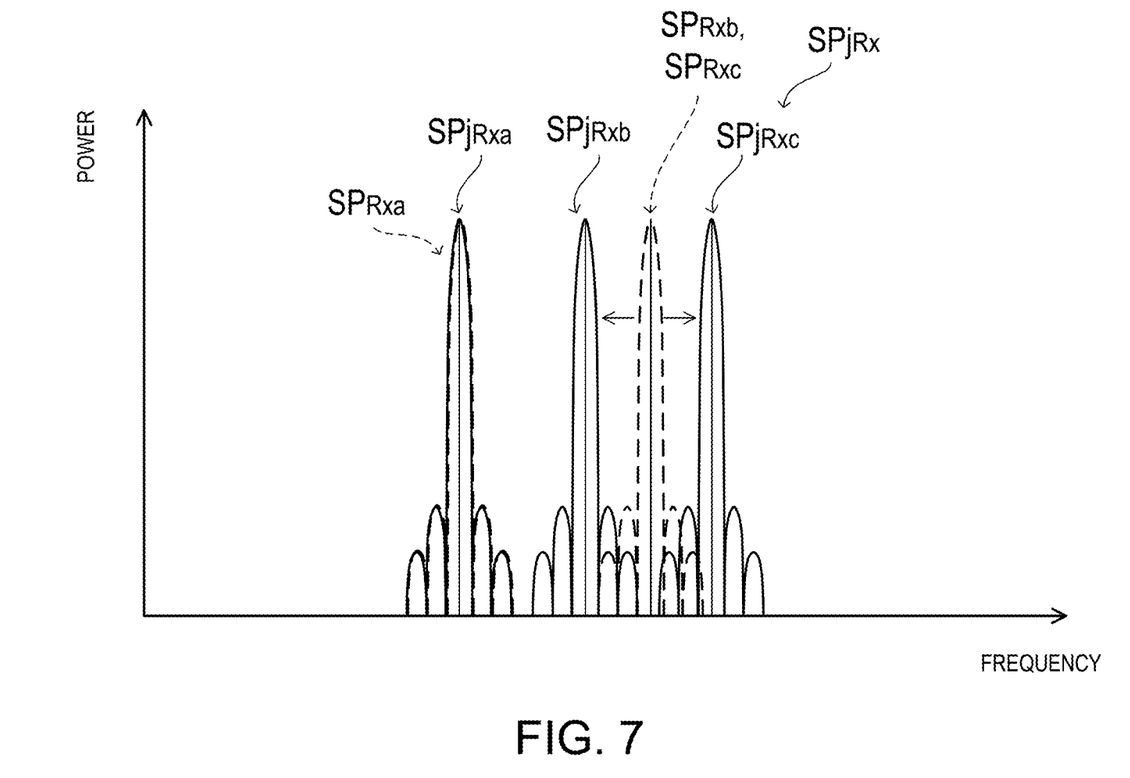
FIG. 7 is a chart illustrating one example of power spectra of reception signals obtained based on reception waves received by a plurality of ultrasonic elements, overlapped with power spectra of processing target signals generated corresponding to the reception signals, respectively.

FIG. 7 is a chart illustrating one example of power spectra $SP_{Rxa}$, $SP_{Rxb}$ and $SP_{Rxc}$ of reception signals Sa, Sb and Sc obtained based on reception waves received by the ultrasonic elements 5a, 5b and 5c, overlapped with power spectra $SPj_{Rxa}$, $SPj_{Rxb}$ and $SPj_{Rxc}$ of processing target signals Sja, Sjb and Sjc generated corresponding to the reception signals Sa, Sb and Sc, respectively. Note that in FIG. 7, the power spectra $SP_{Rxa}$, $SP_{Rxb}$ and $SP_{Rxc}$ of the reception signals Sa, Sb and Sc are indicated by dashed lines, and the power spectra $SPj_{Rxa}$, $SPj_{Rxb}$ and $SPj_{Rxc}$ of the processing target signals Sja, Sjb and Sjc are indicated by solid lines.

The reception signal processor 10a of this modification includes frequency shifters 17a, 17b and 17c. The frequency shifter 17a generates the processing target signal Sja by shifting a frequency of the reception signal Sa obtained based on the reception wave received by the ultrasonic element 5a. The frequency shifter 17b generates the processing target signal Sjb by shifting a frequency of the reception signal Sb obtained based on the reception wave received by the ultrasonic element 5b. The frequency shifter 17c generates the processing target signal Sjc by shifting a frequency of the reception signal Sc obtained based on the reception wave received by the ultrasonic element 5c.

The frequencies of the reception signals which are shifted by the frequency shifters 17a, 17b and 17c are determined before use or determined according to the center frequencies of the reception signals Sa, Sb and Sc for each case. However, in either of the cases, as illustrated in FIG. 7, the frequency shifters 17a, 17b and 17c shift the center frequencies of the reception signals Sa, Sb and Sc to generate the processing target signals Sja, Sjb and Sjc while avoiding interference of the main lobes of the frequency-shifted reception signals Sa, Sb and Sc (i.e., processing target signals Sja, Sjb and Sjc).

FIG. 7 illustrates an example in which the power spectra $SP_{Rxb}$ and $SP_{Rxc}$ of the reception signals Sb and Sc are in match. Further in FIG. 7, an example in which the frequency of the reception signal Sa is not shifted by the frequency shifter 17a, and the frequencies of the reception signals Sb and Sc are shifted by the frequency shifters 17b and 17c is given.

Moreover, the processing target signals Sja, Sjb and Sjc generated as above are inputted to the reception circuit 11, and the reception circuit 11 synthesizes these processing target signals Sja, Sjb and Sjc with each other to generate the synthesized signal S. Since processings performed thereafter are similar to the embodiment, description thereof is omitted.

As the Doppler shift frequency measuring device 2a of this modification, the frequencies of the ultrasonic waves transmitted from the ultrasonic elements 5a, 5b and 5c may be the same, the frequencies of the reception signals corresponding to the ultrasonic elements 5a, 5b and 5c may suitably be shifted to generate the processing target signals Sja, Sjb and Sjc, and the synthesized signal S may be generated by synthesizing them. Even in this case, similar to the case of the embodiment described above, the Doppler shift frequency measuring device including the single reception circuit 11 can be configured. Therefore, the Doppler shift frequency measuring device having the simplified configuration can be provided.

Figure 8:
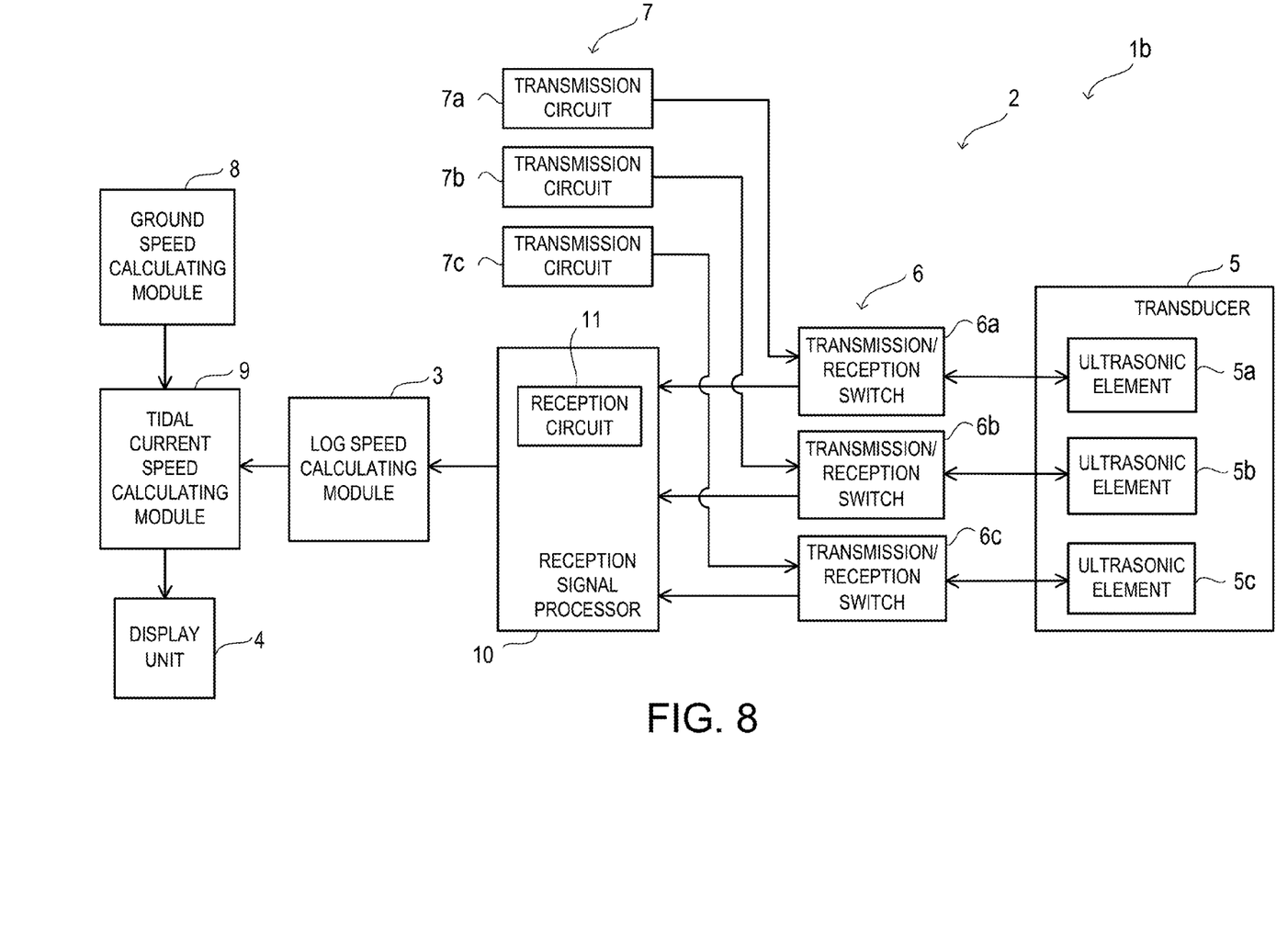
FIG. 8 is a block diagram of a tidal current meter according to another modification.

(2) FIG. 8 is a block diagram of a tidal current meter 1b according to another modification. The tidal current meter 1b calculates a flow of a tide (tidal current) near a ship on which the tidal current meter 1b is mounted. The tidal current meter 1b includes, in addition to the components of the Doppler shift frequency measuring device 2 of the embodiment, a ground speed calculating module 8 and a tidal current speed calculating module 9.

The ground speed calculating module 8 calculates a ground speed of the ship on which the tidal current meter 1b is mounted. In one example, the ground speed calculating module 8 is structured by using a GPS receiver (not illustrated), and calculates the ground speed of the ship based on absolute positions of the ship at two time points.

The tidal current speed calculating module 9 calculates a speed of the tidal current based on the log speed calculated by the log speed calculating module 3 and the ground speed calculated by the ground speed calculating module 8. Specifically, the tidal current speed calculating module 9 calculates, as the tidal current speed, a difference between the log speed calculated by the log speed calculating module 3 and the ground speed calculated by the ground speed calculating module 8.

As described above, according to the tidal current meter 1b of this modification, the tidal current meter including the Doppler shift frequency measuring device which has the simplified configuration can be provided.

(3) In the embodiment, the Doppler shift frequency measuring device 2 including the three ultrasonic elements 5a, 5b and 5c is described as an example; however, without limiting to this, this disclosure may be applied to a Doppler shift frequency measuring device including two, four or more ultrasonic elements.

(4) This disclosure may be applied to a so-called array-type log speed meter, tidal current meter, etc. With the array-type tidal current meter, etc., although correction between channels is required since a variation of an amplitude and a variation of an phase between channels influence beam qualities, by applying this disclosure, these variations can be reduced.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A Doppler shift frequency measuring device, comprising:
   a plurality of transmitters respectively configured to transmit a transmission wave;
   a plurality of receivers provided corresponding to the transmitters, respectively, and configured to receive reception waves that are reflection waves caused by the transmission waves from the transmitters, respectively; and a reception signal processor configured to calculate Doppler shift frequencies of the reception waves by processing reception signals obtained based on the reception waves received by the receivers, wherein the reception signal processor includes:

a reception circuit configured to generate a synthesized signal by synthesizing processing target signals with at least three center frequencies of main lobes of power spectra that are different from each other, the processing target signals generated based on the reception waves; and a Doppler shift frequency calculating module configured to calculate the Doppler shift frequencies of the reception waves based on the synthesized signal.

2. The Doppler shift frequency measuring device of claim 1, wherein the transmitters transmit the transmission waves of which center frequencies of main lobes of power spectra are different from each other, and wherein the reception circuit generates the synthesized signal by synthesizing the reception signals as the processing target signals.

3. The Doppler shift frequency measuring device of claim 2, wherein the center frequencies of the main lobes of the power spectra of the transmission waves are set based on a highest value of a traveling speed of a movable body on which the Doppler shift frequency measuring device is mounted.

4. The Doppler shift frequency measuring device of claim 1, wherein the transmitters transmit the transmission waves of which center frequencies of main lobes of power spectra are the same as each other, and wherein the reception signal processor also includes frequency shifters configured to generate the processing target signals by shifting center frequencies of the reception signals that are obtained based on the reception waves received by the receivers, to different center frequencies, respectively.

5. The Doppler shift frequency measuring device of claim 1, wherein the Doppler shift frequency measuring device is mounted on a ship as a movable body capable of traveling on water.

6. The Doppler shift frequency measuring device of claim 5, further comprising a transducer in which the transmitters and the receivers corresponding to the transmitters are integrated with each other.

7. A log speed meter, comprising:

the Doppler shift frequency measuring device of claim 6; and a log speed calculating module configured to calculate a log speed of the ship on which the Doppler shift frequency measuring device is mounted, based on the Doppler shift frequencies calculated by the Doppler shift frequency measuring device.

8. A tidal current meter, comprising:

the Doppler shift frequency measuring device of claim 6;

a log speed calculating module configured to calculate a log speed of the ship on which the Doppler shift frequency measuring device is mounted, based on the Doppler shift frequencies calculated by the Doppler shift frequency measuring device;

a ground speed calculating module configured to calculate a ground speed of the ship; and a tidal current speed calculating module configured to calculate a speed of a tidal current based on the log speed calculated by the log speed calculating module and the ground speed calculated by the ground speed calculating module.

* * * * *